July 10, 1928.　　　　L. C. BATEMAN　　　　1,677,013
COMPOUND RUBBER TREAD
Filed Aug. 1, 1927
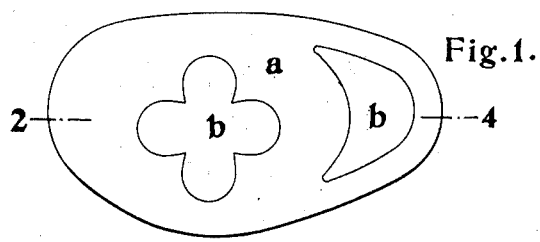
Fig. 1.
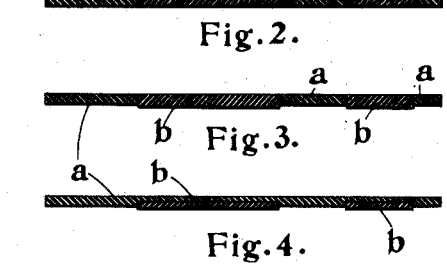
Fig. 2.
Fig. 3.
Fig. 4.
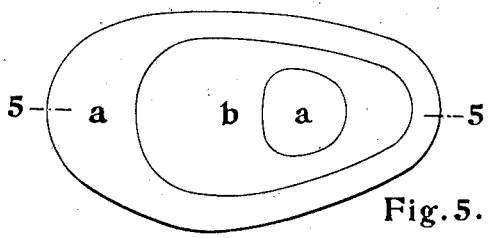
Fig. 5.
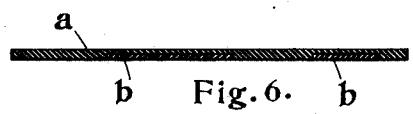
Fig. 6.
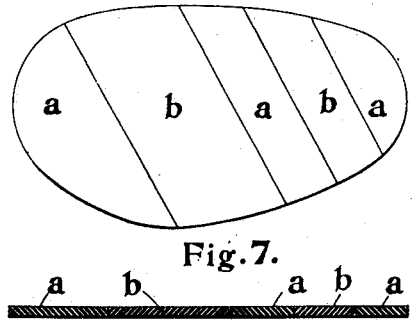
Fig. 7.
Fig. 8.
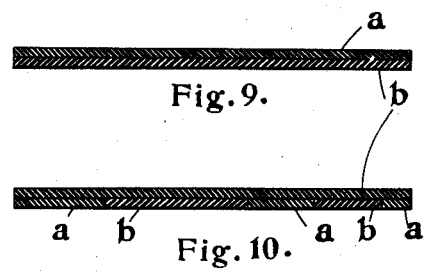
Fig. 9.
Fig. 10.
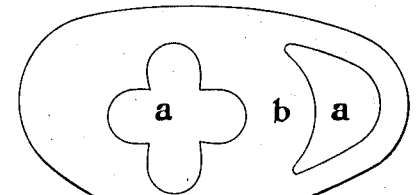
Fig. 11.
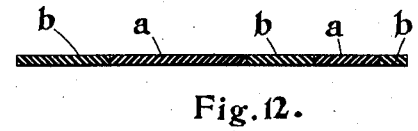
Fig. 12.
Inventor
L. C. Bateman
by
W. E. Evans
Attorney.

Patented July 10, 1928.

1,677,013

UNITED STATES PATENT OFFICE.

LOUIS CHARLES BATEMAN, OF WEST EALING, LONDON, ENGLAND.

COMPOUND RUBBER TREAD.

Application filed August 1, 1927, Serial No. 209,798, and in Great Britain June 26, 1926.

This invention relates to the manufacture or utilization of india-rubber, and especially to the utilization of india-rubber of the kinds known as "crepe" rubber or smoked rubber, and the invention particularly relates to the production of soles and heels for footwear.

The invention has among its objects to employ, for the purpose, a so-called fibrous rubber or fibrous "crepe" rubber or a similar composition produced by the incorporation of rubber latex, care being taken that no acid or other substance is used in the preparation of this composition such as would lead to injury of the composition when subject to the treatment according to the invention.

According to the invention, fibrous rubber, fibrous "crepe" rubber or other similar substance prepared by the use of rubber latex, is employed as a means of utilizing sheets of "crepe" rubber or smoked rubber, by a simple treatment under pressure at a comparatively low temperature not sufficiently high to render the rubber tacky, whereby the fibrous rubber or fibrous "crepe" may be caused to adhere or become thoroughly incorporated with the "crepe" or smoked rubber, so as to be incapable of separation under conditions of normal use, or of separation only with difficulty. By such means, "crepe" rubber may, in a simple treatment, become incorporated with a compositon, by which it may be readily mounted or attached by stitching, nailing or by such means as rubber solution; and thus, in the preparation of soles and heels for footwear, "crepe" rubber may be used in firm and integral association with a substance that may be readily secured to footwear and that is relatively inexpensive and has non-slipping characteristics.

The invention is illustrated by way of example in the accompanying drawings in which Figure 1 is the under-plan of a sole for footwear made according to the invention, Figures 2, 3, and 4 are alternative cross-sections on the line 2—4 of Figure 1, Figure 5 is the under-plan view of another form of sole for footwear made according to the invention, and Figure 6 is a cross-section on the line 5—5 of Figure 5, Figures 7 and 8 are views corresponding to Figures 5 and 6 of another form of sole for footwear made according to the invention.

Figure 9 is a cross-section showing a sheet of "crepe" rubber or smoked rubber secured to a sheet of fibrous rubber.

Figure 10 is a cross-section of a sole on the line 2—4 of Figure 1, showing a sheet of "crepe" rubber beneath.

Figures 11 and 12 are views corresponding to Figures 1 and 2 of a sole for footwear, made according to the invention, in which insets of fibrous rubber are inserted and secured in a sheet of "crepe" rubber or smoked rubber.

In all the figures except Figure 9, soles for footwear are illustrated, but it will be understood that the sheets produced may take the form of combined soles and heels or of heels for footwear, or any other shape, and that the composite material may be produced in sheets, slabs or blocks to be cut into the forms desired, and that the respective insets or parts of the respective substances used according to the invention may take any shape or pattern, and that the tread surface of the fibrous rubber may be provided with a serrated cellular or any other irregular pattern to yield an uneven surface.

In carrying the invention into effect, I may produce fibrous rubber by saturating fibrous or other material, such as felt, with india-rubber latex, the fibrous material being then dried by the use of hot air, or by any other means by which the water may be completely evaporated, leaving the fibrous material impregnated with the latex. After drying, the treated rubber-impregnated fibrous material is submitted to pressure and heat at a low temperature, whereby dense sheets or blocks are produced of fibrous rubber largely composed of pure rubber, but having the fibrous material or felt incorporated with it and having surfaces almost entirely of pure rubber. The temperature employed should not exceed that hereinafter specifically referred to as being employed in the incorporation of the inserted pieces of "crepe" rubber or similar rubber.

It will be understood that the content of the rubber latex may vary, and that the latex used may be rendered substantially constant in density by evaporation of part of its content of water, or the fibrous material may be repeatedly impregnated with latex, and the content of water evaporated between successive impregnations and that suitable pigments may be incorporated with the latex. Sheets of such fibrous rubber composition may be produced of a thickness from 1/16 to 1/8 of an inch, or more or less, according to the invention. The product has qualities which render it of utility in substitution for leather or rubber in the manufacture of soles and heels for boots and shoes, and for other purposes.

Such a product is utilized according to the invention for the incorporation with it of "crepe" rubber without the use of a rubber solvent, and solely by the application of pressure and heat at a low temperature. Thus, a sheet of fibrous rubber such as $a$ (Figures 1 and 2) produced in the manner described may be formed into the shape of a sole and heel, or of soles or of heels for footwear and holes may be cut out of the sheets in determined positions and shape, and insert pieces of "crepe" rubber or smoked rubber $b$ of the same shape as the holes, may be inserted therein. The inserted pieces of "crepe" or smoked rubber $b$ may be of the same thickness as the sheet of fibrous rubber $a$, or slightly thicker. The sheets of fibrous rubber with the pieces of "crepe" or smoked rubber inserted, are then submitted to pressure and to heat at a low temperature, whereby the edges of the inserted pieces $b$ (Figures 1 and 2) are pressed against the edges of the holes in the sheets of fibrous rubber $a$, while heat is applied. The sheets of fibrous rubber $a$ with the inserted pieces of "crepe" rubber or smoked rubber $b$ may be subject to the treatment in a Daylight press as used in vulcanizing, it being, however, understood that the temperature applied is not so high as to produce tackiness. Steam, at 5 to 10 lbs. pressure, has been found effective when applied for a period of from two to three minutes on sheets of fibrous rubber $a$ having inserted pieces of "crepe" rubber or smoked rubber $b$ in the manner described, the insertions $b$ being by such treatment, thoroughly incorporated with the sheet of fibrous rubber $a$ at the edges so that thus, a continuous homogeneous sheet is produced having perfectly even or smooth faces on both sides, and in which "crepe" rubber or smoked rubber is incorporated at the positions subject to wear; or the whole may be passed through a heated calender under corresponding conditions of temperature and pressure. Such composite sheets as $a\ b$ (Figures 1 and 2) provided in the form of a sole and heel or of a sole or heel, may be attached to footwear by stitching, nailing or by the use of a suitable adhesive such as ordinary rubber solution, or where the composite sheet or sole and heel or sole or heel is secured by treatment according to the invention to a sheet of "crepe" rubber, smoked rubber or the like, the latter may be caused to adhere to a foundation sole of leather by means of rubber solution or in the manner in which soles or heels of crepe are usually applied.

The fibrous rubber, which is capable of being secured to footwear in the same way as leather, has less tendency to cause slipping during wear than has "crepe" or smoked rubber, the actual wear being borne by the inserted pieces of "crepe" rubber or smoked rubber.

It will be understod that, while a homogeneous sheet may be produced that is substantially even or smooth on both faces, in the use of insertions of substantially the same thickness as the sheets of fibrous rubber used, the insertions of "crepe" or smoked rubber $b$ may be provided of substantially greater thickness, and they may be provided to protrude slightly beyond the underface of the sole or heel, so that thus the underface of the insertions form the tread surface as illustrated in Figure 3. Furthermore, the insertions $b$ may, instead, be applied within recesses formed for their reception on the underface of the sheets of fibrous rubber $a$ as illustrated in Figure 4, they may be applied against the plain underface of the sheets of fibrous rubber. Furthermore, instead of separate insertions of "crepe" rubber or smoked rubber, the insertion $b$ may be continuous. Thus, for example, an insertion $b$ may be formed as a band near the edge of the sole or heel and closely to follow its conformation as illustrated in Figures 5 and 6, and the insertions may comprise separate transverse parts $b$, and thus the composite sole or heel may be made up of separate parts of fibrous rubber $a$ and of "crepe" or smoked rubber $b$ which are rendered into an integral sheet by the treatment according to the invention, as illustrated in Figures 7 and 8. It will thus be understood that, in the preparation of a sole or heel for footwear, the fibrous rubber may be formed to any particular shape and from any number of pieces, as may also the "crepe" rubber or smoked rubber, it being only necessary that, where the respective parts are provided of the same thickness and the respective materials are caused to adhere at the edges only, they may be laid in a mould so that the pressure imposed is sufficient under the heat applied to ensure effective contact and firm adhesion between the contiguous edges of the respective materials, in order to form a thoroughly homogeneous product.

It will furthermore be understood that, instead of incorporating fibrous rubber with "crepe" rubber or smoked rubber in the manner described, the incorporation may be effected by laying a sheet of one substance such as fibrous rubber $a$ upon a sheet of the other such as "crepe" rubber $b$ as illustrated in Figure 9, for the production of a composite sheet or other product for any particular purpose, by the application of pressure and heat in the manner described; or again that a composite sheet of fibrous rubber with insertions of "crepe" rubber may be secured by treatment according to the invention to a sheet of crepe rubber such as $b$ as illustrated in Figure 10, and it will be understood that no limitation is involved to the position, shape, dimensions or purpose of the product.

It will moreover be understood that instead of inserting pieces of "crepe" rubber or smoked rubber within sheets of fibrous rubber or fibrous "crepe" rubber in the manner prescribed, pieces of fibrous rubber or fibrous "crepe" rubber $a$ may be inserted in sheets of "crepe" rubber or smoked rubber $b$ as illustrated in Figures 11 and 12 and incorporated by the application of pressure and heat in the manner hereinbefore described.

It will furthermore be understood that the product is not vulcanized, and that should it be desired that the finished article be vulcanized, suitable vulcanizing agents may be incorporated with the fibrous rubber or with the "crepe" rubber or smoked rubber; or vulcanization may be carried out by known cold-cure processes but it is preferred not to vulcanize; and that instead of producing fibrous rubber in the use of felt or wool in the manner hereinbefore described other similar fibrous substances or other material or fabric such as canvas may be used and these fibrous or other substances or fabric may be impregnated with rubber latex and the respective substances incorporated by the application of pressure and heat in a manner substantially as hereinbefore described, it being understood that the fibrous or other material used shall have such physical qualities that render it suitable for the preparation of fibrous rubber and is not prejudicially affected by the heat and pressure treatment employed. It will, however, be understood that in general it is preferred to utilize felt when preparing the soles or heels of boots or shoes. It is preferred to cut out holes completely in the sheet of fibrous rubber at the positions subject to the greatest wear as illustrated in Figures 1 and 2.

I claim:—

1. A shoe sole comprising a felt base impregnated with latex having inserted therein to lay substantially flush therewith an inlay of crepe rubber.

2. A shoe sole comprising a compressed latex impregnated fibrous base having surface depressions and inlays of crepe rubber retained in said depressions.

LOUIS CHARLES BATEMAN.